United States Patent
Ferguson et al.

(10) Patent No.: US 11,151,632 B2
(45) Date of Patent: Oct. 19, 2021

(54) SYSTEMS AND METHODS FOR VISUAL SEARCH AND AUTONOMOUS DELIVERY

(71) Applicant: Nuro, Inc., Mountain View, CA (US)

(72) Inventors: David Ferguson, San Francisco, CA (US); Jiajun Zhu, Palo Alto, CA (US); Nan Ransohoff, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 167 days.

(21) Appl. No.: 16/158,940

(22) Filed: Oct. 12, 2018

(65) Prior Publication Data

US 2019/0043009 A1 Feb. 7, 2019

Related U.S. Application Data

(63) Continuation-in-part of application No. PCT/US2018/044361, filed on Jul. 30, 2018.
(Continued)

(51) Int. Cl.
*G06Q 30/06* (2012.01)
*G08G 1/04* (2006.01)
(Continued)

(52) U.S. Cl.
CPC ............ *G06Q 30/0631* (2013.01); *A23L 2/52* (2013.01); *A23L 5/00* (2016.08); *A23L 7/109* (2016.08); *A47J 37/0658* (2013.01); *A47J 47/00* (2013.01); *B60H 1/00364* (2013.01); *B60H 1/00735* (2013.01); *B60P 1/36* (2013.01); *B60P 3/007* (2013.01); *B60P 3/0257* (2013.01); *B60R 19/18* (2013.01); *B60R 19/483* (2013.01); *B60R 21/34* (2013.01); *B60R 25/25* (2013.01);
(Continued)

(58) Field of Classification Search
CPC .. G06Q 30/00; G06Q 10/083; G06Q 10/0833; G06Q 10/0835; G06Q 10/0836; G06Q 10/0837; G06Q 30/0631
USPC ........................................................ 705/332
See application file for complete search history.

(56) References Cited

U.S. PATENT DOCUMENTS

2010/0082447 A1* 4/2010 Lin .................... G06Q 30/0601
705/26.1
2010/0084426 A1 4/2010 Devers et al.
(Continued)

OTHER PUBLICATIONS

Lo et al., "Mobile merchandise evaluation service using novel information retrieval and image recognition technology", Computer Communications 34, 120, 128 (Year: 2011).*
(Continued)

*Primary Examiner* — Emmett K. Walsh

(57) ABSTRACT

A delivery control system includes a communication device configured to receive an image of a product from a computing device of a customer, at least one processor, and a memory storing instructions which, when executed by the at least one processor, cause the delivery control system to perform an image recognition process on the image to identify at least one product based on the image, transmit the identified at least one product to the computing device via the communication device, receive from the computing device a product selected by the customer from among the identified at least one product, and instruct an robot vehicle to deliver the selected product to the customer.

20 Claims, 5 Drawing Sheets

Related U.S. Application Data

(60) Provisional application No. 62/538,538, filed on Jul. 28, 2017.

(51) Int. Cl.

| | | |
|---|---|---|
| *B60P 3/00* | (2006.01) | |
| *B60R 21/34* | (2011.01) | |
| *B65G 67/24* | (2006.01) | |
| *G01C 21/34* | (2006.01) | |
| *G05D 1/00* | (2006.01) | |
| *G05D 1/02* | (2020.01) | |
| *G05D 1/12* | (2006.01) | |
| *G06K 7/10* | (2006.01) | |
| *G06Q 10/06* | (2012.01) | |
| *G06Q 10/08* | (2012.01) | |
| *G06Q 50/12* | (2012.01) | |
| *G06Q 50/28* | (2012.01) | |
| *G08G 1/00* | (2006.01) | |
| *H04L 29/08* | (2006.01) | |
| *G06N 20/00* | (2019.01) | |
| *B60R 25/25* | (2013.01) | |
| *A23L 5/00* | (2016.01) | |
| *A23L 7/109* | (2016.01) | |
| *G06F 16/955* | (2019.01) | |
| *A23L 2/52* | (2006.01) | |
| *A47J 37/06* | (2006.01) | |
| *A47J 47/00* | (2006.01) | |
| *B60H 1/00* | (2006.01) | |
| *B60P 1/36* | (2006.01) | |
| *B60P 3/025* | (2006.01) | |
| *B60R 19/18* | (2006.01) | |
| *G06K 7/14* | (2006.01) | |
| *G06K 19/06* | (2006.01) | |
| *G06Q 20/00* | (2012.01) | |
| *G06Q 20/12* | (2012.01) | |
| *G06Q 20/18* | (2012.01) | |
| *G07F 17/00* | (2006.01) | |
| *G07F 17/12* | (2006.01) | |
| *G07C 5/02* | (2006.01) | |
| *G07C 5/08* | (2006.01) | |
| *G06K 9/00* | (2006.01) | |
| *G06Q 50/30* | (2012.01) | |
| *G06K 19/07* | (2006.01) | |
| *H04W 4/024* | (2018.01) | |
| *H04W 4/40* | (2018.01) | |
| *G06Q 30/02* | (2012.01) | |
| *G01C 21/20* | (2006.01) | |
| *B60R 19/48* | (2006.01) | |
| *G06F 3/0484* | (2013.01) | |
| *B60R 21/36* | (2011.01) | |
| *H04N 5/76* | (2006.01) | |
| *H05B 6/68* | (2006.01) | |

(52) U.S. Cl.
CPC .......... *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 9/00201* (2013.01); *G06K 9/00791* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0266* (2013.01); *G06Q 30/0645* (2013.01); *G06Q 50/12* (2013.01); *G06Q 50/28* (2013.01); *G06Q 50/30* (2013.01); *G07C 5/02* (2013.01); *G07C 5/08* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *A23V 2002/00* (2013.01); *B60R 21/36* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01); *H05B 6/688* (2013.01)

(56) References Cited

U.S. PATENT DOCUMENTS

| | | | |
|---|---|---|---|
| 2011/0246328 A1* | 10/2011 | Dunwoody | G06Q 30/0629 705/27.1 |
| 2013/0282844 A1* | 10/2013 | Logan | H04M 3/42263 709/206 |
| 2014/0081445 A1 | 3/2014 | Villamar | |
| 2014/0104379 A1* | 4/2014 | Glasgow | H04N 5/23229 348/42 |
| 2014/0337176 A1* | 11/2014 | Ruvini | G06Q 30/0625 705/26.62 |
| 2015/0006005 A1 | 1/2015 | Yu et al. | |
| 2015/0242922 A1* | 8/2015 | Zamer | G06Q 10/087 705/26.61 |
| 2017/0174343 A1 | 6/2017 | Erickson et al. | |
| 2017/0286892 A1* | 10/2017 | Studnicka | G06Q 20/401 |
| 2018/0197223 A1* | 7/2018 | Grossman | G06K 9/4619 |
| 2018/0336605 A1* | 11/2018 | Volta | G06Q 30/0241 |

OTHER PUBLICATIONS

International Search Report and Written Opinion issued by the International Searching Authority dated Oct. 10, 2018 in International Application No. PCT/US2018/044361, 12 pages.

* cited by examiner

SYSTEMS AND METHODS FOR VISUAL SEARCH AND AUTONOMOUS DELIVERY

CROSS-REFERENCE TO RELATED APPLICATIONS

The present application is a continuation-in-part of International Application No. PCT/US2018/044361, filed on Jul. 30, 2018, which claims the benefit of U.S. Provisional Application No. 62/538,538, filed on Jul. 28, 2017. The entire contents of each of the foregoing applications are hereby incorporated by reference.

FIELD OF THE TECHNOLOGY

The present application relates to systems and methods for autonomous delivery, and in particular, to systems and methods for autonomous delivery based on a visual search.

BACKGROUND

Businesses have been focusing on easing customer burden in placing orders. For example, customers have traditionally had to travel to brick and mortar stores to buy items. But now, consumers are able to go to online stores for shopping needs and thereby reduce, by clicking hyperlinks in websites, traveling time and effort in looking around a physical store to find items. Ease of ordering and paying for products lead more consumers to online shopping. Due to this shopping trend, most products are sold in online shopping websites.

Although online shopping has proliferated, customers may still experience difficulty in trying to locate and purchase a particular product they see outside of online shopping websites. For example, a customer may see an item of interest in a real world setting or in a web page that is not a shopping website, and to find the item, she would have to go through a series of steps to search for the product on the Internet, such as searching using brand names, product names, or other specifics about the product. Further, it may also be difficult for the consumer to locate a merchant which carries the product. Accordingly, there is continuing interest in reducing the burden of consumers in locating and purchase products.

SUMMARY

This disclosure relates to improvement in online shopping with image recognition processing on images of products transmitted from customers' devices.

In various embodiments of the present disclosure, a delivery control system includes a communication device configured to receive an image of a product from a computing device of a customer, at least one processor, and a memory storing instructions which, when executed by the at least one processor, cause the delivery control system to perform an image recognition process on the image to identify at least one product based on the image, transmit the identified at least one product to the computing device via the communication device, receive from the computing device a product selected by the customer from among the identified at least one product, and instruct an robot vehicle to deliver the selected product to the customer.

In various embodiments, the instructions, when executed by the at least one processor, further cause the delivery control system to transmit a plurality of merchants to the computing device before the image is received.

In various embodiments, the communication device is further configured to receive from the computing device a merchant selected by the customer. The identified at least one product is handled by the selected merchant.

In various embodiments, the instructions, when executed by the at least one processor, further cause the delivery control system to determine whether or not the selected product is handled by the selected merchant.

In various embodiments, the identified at least one product is handled by a plurality of merchants. The instructions, when executed by the at least one processor, further cause the delivery control system to transmit the plurality of merchants to the computing device via the communication device. The communication device is further configured to receive from the computing device a merchant selected from the plurality of merchants.

In various embodiments, the instructions, wherein the identified at least one product includes alternative products in a case when no products are an exact match from the image recognition process.

In various embodiments, the instructions, when executed by the at least one processor, further cause the delivery control system to transmit alternate products to the computing device in a case when the identified at least one product is not available.

In accordance with aspects of the present disclosure, a computing device for ordering a product, the computing device comprising a communication device, a display screen, at least one processor, and a memory. The instructions are stored in the memory and, when executed by the at least one processor, cause the computing device to transmit via the communication device an image of a product to a delivery control system, receive at least one identified product which is identified by the delivery system performing an image recognition process on the image, display the at least one identified product on the display screen, receive a user selection from among the at least one identified product where the user selection indicates a selected product, and transmit via the communication device an order for the selected product to the delivery system.

In various embodiments, the communication device is further configured to transmit a merchant selected by the customer to the delivery control system. In various embodiments, the at least one identified product is handled by the selected merchant.

In various embodiments, the at least one identified product is handled by a plurality of merchants. The instructions, when executed by the at least one processor, further cause the computing device to receive the plurality of merchants from the delivery control system before the at least one identified product is received.

In various embodiments, the communication device is further configured to transmit a merchant selected by the customer from the plurality of merchants. The selected product is handled by the selected merchant.

In various embodiments, wherein the at least one identified product includes alternate products from the delivery control system in a case when no products are an exact match from the image recognition process.

In various embodiments, the instructions, when executed by the at least one processor, further cause the computing device to receive alternate products from the delivery control system in a case when the at least one identified product is not available.

In accordance with aspects of the present disclosure, a nontransitory computer readable storage medium including instructions that, when executed by a computer, cause the computer to perform a method comprising receiving an image of a product from a computing device of a customer, performing an image recognition process on the image to identify at least one product based on the image, transmitting the identified at least one product to the computing device, receiving from the computing device a product selected by the customer from among the identified at least one product, and instructing a robot vehicle to deliver the selected product to the customer.

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description, which sets forth illustrative embodiments in which the principles of the technology are utilized, and to the accompanying drawings, of which.

DETAILED DESCRIPTION

Figure 1:
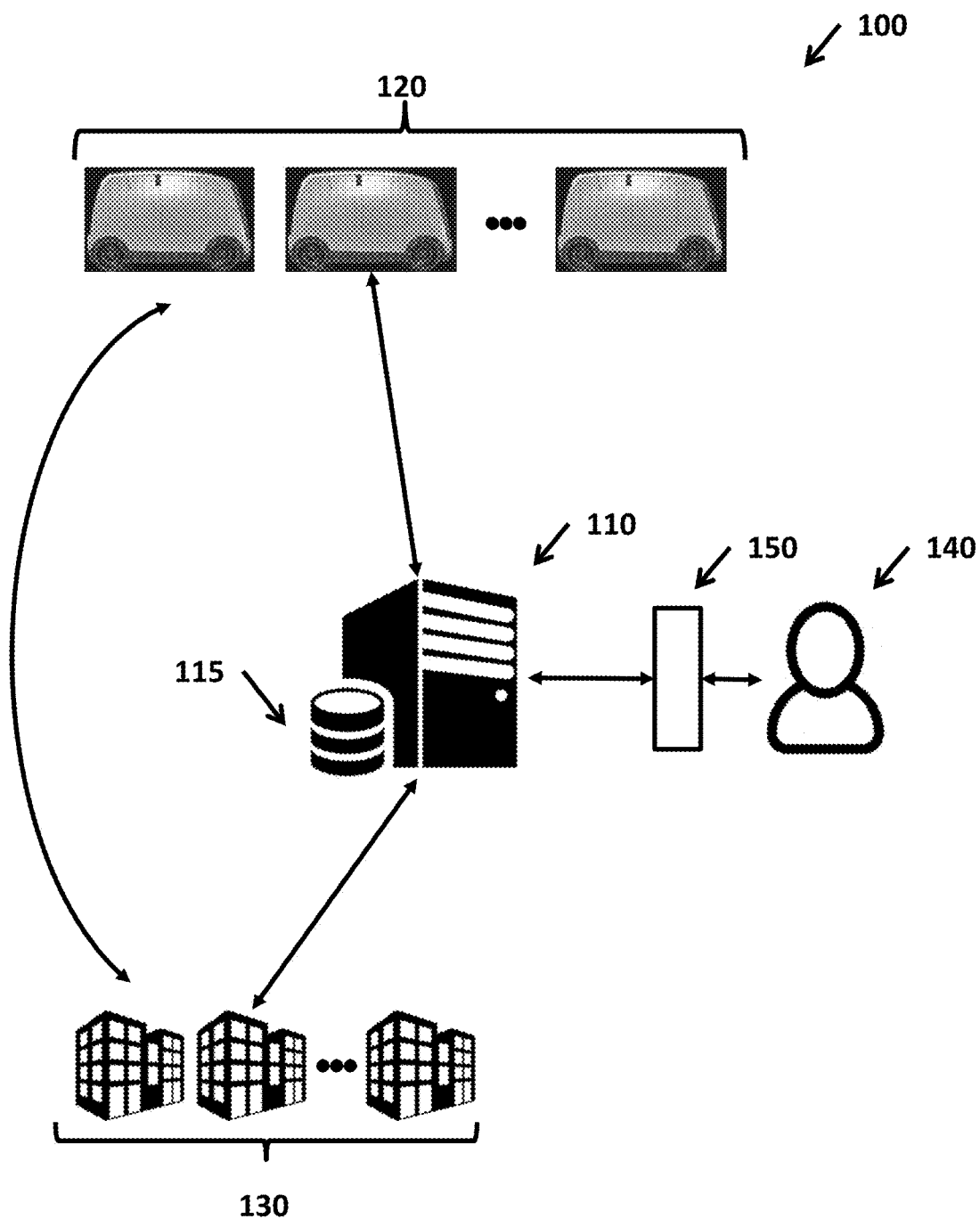
FIG. 1 is a graphical diagram illustrating an exemplary delivery control system for visual search and autonomous delivery, in accordance with aspects of the present disclosure.

This disclosure relates to systems and methods for autonomous delivery based on a visual search based on images of products and, in particular, using a robot vehicle to autonomously deliver a product resulting from the visual search to customers. While mobile technology has significantly progressed in a short time to integrate camera technology, image capturing capability of smart devices has not been utilized sufficiently in searching for products that are encountered outside of traditional shopping or online shopping settings. Thus, in an effort to make online searches for products easier, image capturing capability can be utilized to perform a visual search for products based on images of the products.

Disclosed herein is a delivery control system and method for receiving an image of a product from a customer, performing an image recognition process to identify products in the image, receiving a selection of an identified product from the customer, and autonomously delivering the selected product to the customer. The delivery control system directs a robot vehicle to deliver the product to the location of the customer. Thus, customers can easily identify, order, and receive products by transmitting an image of the product.

Definitions

As used herein, the term "autonomous" includes fully-autonomous, semi-autonomous, and any configuration in which a vehicle can operate and/or travel in a controlled manner for a period without human intervention.

As used herein, the term "fleet," "sub-fleet," and like terms are used to indicate a number of land vehicles, watercraft or aircraft operating together or under the same ownership. In some embodiments, the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports robot vehicle s or is itself a robot vehicle. Typical robot vehicle s include cars, wagons, vans, motor vehicles (e.g., tricycles, trucks, trailers, buses, etc.), railed vehicles (e.g., trains, trams, etc.), watercrafts (e.g., ships, boats, ferries, landing craft, barges, rafts, etc.), aerial drones, hovercrafts (air, land and water types), aircrafts, and even including spacecrafts.

As used herein, the term "user," "operator," "fleet operator," and like terms are used to indicate the entity that owns or is responsible for managing and operating the robot fleet.

As used herein, the term "customer" and like terms are used to indicate the entity that requests services provided by the robot fleet.

As used herein, the term "server," "computer server," "central server," "main server," "mobile device," "smart device," and like terms are used to indicate a computer or device on a network that manages the fleet resources, namely the robot vehicles.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

In accordance with the description herein, smart devices or computing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, phablets, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, digital processing devices include an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems or mobile operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Referring now to FIG. 1, there is shown an exemplary delivery control environment 100 for autonomously delivering products upon reception of an image of a product from a customer, in accordance with embodiments of the present disclosure. The delivery control environment 100 includes a delivery control system 110, an autonomous robot fleet 120, and a plurality of merchants 130. The delivery control system 110, the robot fleet 120, and the merchants 130 communicate with each other via a network (not shown), which may be a mesh network, wireless network, ad hoc network, Internet, or MANET, among others. The delivery control system 110 communicates with the customer 140 through a network and a device 150. In various embodiments, the device 150 may be a customer smart device, a customer computer, or similar devices that can capture, receive, or access an image of a product and communicate the image to the delivery control system 110. In various embodiments, the device 150 may be a kiosk or other networked interface device that can capture, receive, or access an image of a product and communicate the image to the delivery control system 110. In accordance with aspects of the present disclosure, when a consumer would like to purchase a product she sees, the customer 140 may transmit an image of the product to the delivery control system 110.

Figure 2:
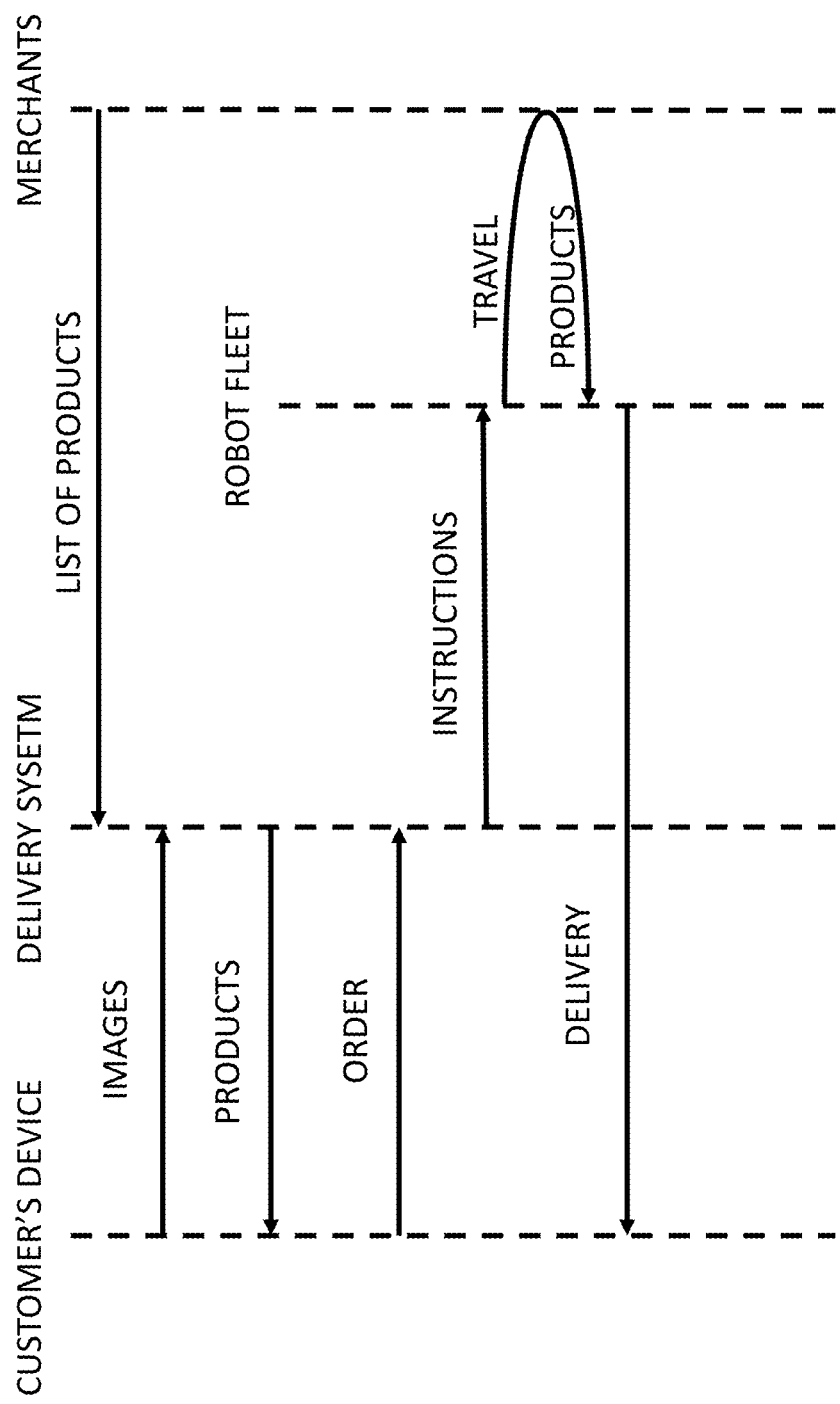
FIG. 2 is a flow diagram showing exemplary information flow for a customer device, a delivery system, merchants, and a robot fleet, in accordance with aspects of the present disclosure.

An exemplary flow of information is shown in FIG. 2, which will be described in connection with FIG. 1. After initiating communication between the delivery control system 110 and the customer 140, the device 150, which is shown as "CUSTOMER'S DEVICE" in FIG. 2, may transmit an image of a product to the delivery control system 110. In an aspect, the image of the product may be obtained from the Internet or captured by the customer 140 using his/her smart device or camera, or obtained from another source. In another aspect, the image of the product may or may not show a barcode, product name, or brand name. Further, the image may be captured from any arbitrary angle. In various embodiments, the image may not show any cover or other identifying information. However, the image includes at least some features of the product so that the image can be used to identify the product.

The delivery control system 110 may include a database 115, which can save a list of merchants 130 that can provide products to customers through the delivery control system 110. Further, the database 1150 may include images of all of the merchant products. In an aspect, the merchants 130 may provide to the delivery control system 110 images of all of the products they carry.

In another aspect, the merchants 130 may provide one or more images for each product. For example, images of the front, back, left side, right side, top, or bottom view of a product may be captured and transmitted to the delivery control system 110 as reference images for the product. This list of views is exemplary and non-limiting, and other views or image perspectives can be included. These reference images may be used for image recognition for the product. In various embodiments, the merchants 130 may provide images of products captured from any suitable angle.

In a further aspect, the merchants 130 may provide images of each product with different lighting and/or different surroundings. For example, each product may be captured in a dark surrounding, in sunlight, or under shade with bright surrounding, among other lighting or surroundings. Images of the product in different lighting and surroundings may help with identifying products in images transmitted from the customer 140. Accordingly, the delivery control system 110 may include a list of merchants 130, and for each merchant, a list of products that each merchant carries, and images for each product.

The delivery control system 110 may utilize one or more image recognition algorithms to identify a product from an image. In various embodiments, image recognition may be accomplished using artificial intelligence. In an aspect, the delivery control system 110 may use machine learning to train the image recognition algorithms to increase reliability of the image recognition. Images of products provided by the merchants 130 can be used for the machine learning and training. In an aspect, training of the image recognition algorithms may be done using reinforcement, neural networks (multilayer perception), decision trees, or linear regression. The image recognition algorithms may be supervised or unsupervised.

Upon receiving the image of the product from the device 150, the delivery control system 110 may perform image recognition algorithms on the image from the customer 140 to identify one or more products. In an aspect, the image recognition algorithm may be trained by using strong or weak discriminators. During the training of the algorithms, weights of discriminators may be increased or decreased based on success of failure in image recognition.

The image recognition algorithms may result in potential product matches for the product captured in the image. Then, the delivery control system 110 may transmit a list of the identified products to the customer 140 via the device 150

(e.g., a smartphone or computing device). The customer 140 may review the identified products and select one product from the list of identified products. The selected product can be communicated back to the delivery control system 110.

In an aspect, the delivery control system 110 may transmit to the customer a list of merchants which carry the identified products. Each merchant in the list may carry one or more of the identified products. In this way, the customer 140 may be informed that each identified product can be fulfilled by a merchant. In various embodiments, the customer 140 may select a merchant from the list of merchants to fulfill an order for an identified product.

In various embodiments, the delivery control system 110 may receive from the customer 140 a list of preferred merchants before or at the same time that the customer 140 transmits the image of the product. In this way, the customer 140 can limit the breadth of search for products to the preferred merchants.

In a further aspect, when the delivery control system 110 cannot find a product after performing the image recognition process, the delivery control system 110 may suggest and provide a list of alternate products which may be similar to the product in the image. The alternate products may not be the product in the image but may be sufficiently close to the product. In this way, the customer 140 can receive a list of identified products even if no exact match is found.

After receiving a list of products, the customer 140 may select one or more product from the list and place an order for the selected product(s) to the delivery control system 110. At this time, the customer 140 may also pay for the selected product(s). After payment, the delivery control system 110 may summon a robot vehicle, which can be semi-autonomous or fully-autonomous, to pick up the selected product and deliver it to a location of the customer 140. In various embodiments, the current location of the customer 140 may be identified based on a global positioning system sensor integrated in the device 150 (e.g., a smart device or computing device.) In various embodiments, the delivery location can be specified by the customer.

Upon reception of the selected product and payment from the customer 140, the delivery control system 110 can communicate with a robot vehicle in the robot fleet 120. In an aspect, the delivery control system 110 may receive position information for each robot vehicle in the robot fleet 120 and select a robot vehicle located in an optimal location based on the locations of the robot vehicles, the locations of the merchants, and the location of the customer 140. In an aspect, based on the location of the customer 140 and locations of the robot vehicles 120, the delivery control system 110 may select a robot vehicle 120, which is optimally located and capable of delivering the selected product as requested by the customer 140. In another aspect, the delivery control system 110 may optimize routes to the location of the customer 140 from the location of the selected robot vehicle 120 and instruct the selected robot vehicle 120 to travel to the location of the customer 140 by following the optimized route. In further aspect, the delivery control system 110 may transmit to the selected robot vehicle the location of the customer 140, and the selected robot vehicle may perform a search for an optimum route to the location of the customer 140 and autonomously drive to the location of the customer 140 by following the optimum route.

In a case when the selected robot vehicle contains or includes the selected product in its compartment or storage space, the selected robot vehicle autonomously navigates to the location of the customer 140. In an aspect, the delivery control system 110 may find an optimum route under the current traffic environment and instruct the selected robot vehicle to follow the optimum route to the customer 140. In another aspect, the delivery control system 110 may relay the location of the customer 140 and the selected robot vehicle may perform a route search and follow an optimum route to navigate to the customer 140.

In another case when no robot vehicles contain or include the selected product, the selected robot vehicle may be instructed to travel to the selected merchant first, pick up the selected product at the selected merchant, and then deliver the selected product to the customer 140.

Now referring back to FIG. 1, the robot fleet 120 may communicate with the plurality of merchants 130 so that a robot vehicle may visit a merchant to receive products or a merchant may request a robot vehicle to come and restock products in the compartment of the robot vehicle. Detail features of the robot vehicle are described in connection with FIG. 3.

In various embodiments, the robot fleet 120 may be configured for land travel, such as a small fully-autonomous or semi-autonomous automobile. The fully-autonomous or semi-autonomous automobile may be narrow (e.g., 2-5 feet wide) or wide (e.g., greater than 5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land robot vehicle s may be configured with a maximum speed range from 1.0 mph to about 90.0 mph for high speed, intrastate or interstate driving. Each robot vehicle in the fleet may be equipped with onboard sensors (e.g., cameras (running at a high frame rate, akin to video), LiDAR, radar, ultrasonic sensors, microphones, etc.) and internal computer processing to constantly determine where it can safely navigate, what other objects are around each robot vehicle and what it may do.

In some embodiments, the robot fleet 120 may be semi-autonomous. In some embodiments, it may be necessary to have human interaction between the robot fleet 120, the fleet operator, and the customer 140 to address previously unforeseen issues (e.g., a malfunction with the navigation module, provider inventory issues, unanticipated traffic or road conditions, or direct customer interaction after the robot arrives at the customer location).

In some embodiments, the robot fleet 120 may be controlled directly by a fleet operator. In some embodiments, it may be necessary to have direct human interaction between the robot fleet 120 and/or the fleet operator to address maintenance issues such as mechanical failure, electrical failure, or a traffic accident. In aspects, the fleet operator may remotely operate the robot fleet 120.

In some embodiments, each robot vehicle 120 may be configured with a working speed range from 13.0 mph to 45.0 mph. In some embodiments, the land robot fleet 120 in the fleet may be configured with a maximum speed range from 13.0 mph to about 90.0 mph.

In some embodiments, the robot fleet 120 may be configured for water travel as a watercraft and is configured with a working speed range from 1.0 mph to 45.0 mph.

In some embodiments, the robot fleet 120 may be configured for hover travel as an over-land or over-water hovercraft and is configured with a working speed range from 1.0 mph to 60.0 mph.

In some embodiments, the robot fleet 120 may be configured for air travel as an aerial drone or aerial hovercraft and is configured with a working speed range from 1.0 mph to 80.0 mph.

In some embodiments, the robot fleet 120 may be further configured to be part of a sub-fleet of robot vehicle s, and each sub-fleet may be configured to operate independently or in tandem with multiple sub-fleets having two or more sub-fleets.

In some embodiments, the robot vehicle 120 may be accessed directly by the customer 140 without a physical key, when the robot vehicle 120 arrives at the location of the customer 140. Authentication should be passed by the customer 140 to access the robot vehicle 120.

In some embodiments, there will likely be times when a robot vehicle 120 breaks down, has an internal system or module failure or is in need of maintenance. For example, in the event that the navigation module should fail, each robot vehicle 120 within the fleet is configurable to allow for direct control of the robot vehicle's processor to override the conveyance and sensor systems (i.e., cameras, etc.) by a fleet operator to allow for the safe return of the vehicle to a base station for repair.

Figure 3:
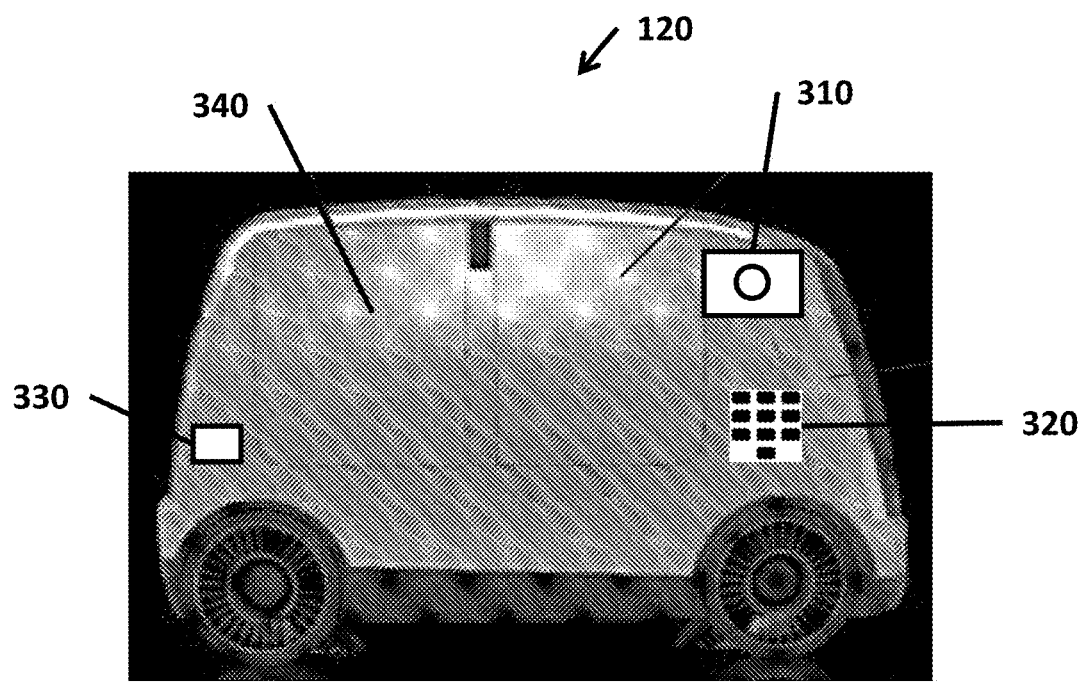
FIG. 3 is an illustration of an exemplary robot vehicle in a robot fleet, in accordance with aspects of the present disclosure.

FIG. 3 shows exemplary features of a robot vehicle 120 for delivering products to customers. In various embodiments, the robot vehicle 120 may include several authentication devices, such as an image capturing device 310, a keypad 320, and/or a scanner 330. When the robot vehicle 120 arrives at the location of the customer 140, the robot vehicle 120 can permit access to the products after authenticating the customer 140. For example, the robot vehicle 120 can take a picture of the customer 140 using the image capturing device 310 and can perform facial recognition. When the customer 140 is verified, the customer 140 can access a compartment 340 of the robot vehicle 120 and retrieve the product.

In some embodiments, the customer 140 can be given a key code to access the robot vehicle 120 via a text message, an email, or an image from the delivery control system 110. When the robot vehicle 120 arrives at the location of the customer 140, the customer 140 can enter the key code via the keypad 320. If the entered key code matches the key code given by the delivery control system 110, the customer 140 is granted access to the robot vehicle 120.

In some embodiments, the customer 140 can be authenticated by the scanner 330. The customer 140 can place his/her hand on the scanner 330, which can scan biometrics of the hand to verify the customer 140. For example, the biometrics may include fingerprint, hand geometry, and/or handwriting, among other things. This types of authentication described herein are merely exemplary and are not meant to be limiting, and other variations are contemplated. For example, in various embodiments, the robot vehicle 120 may utilize other types of biometric data, such as iris recognition by using the scanner 330. Further, the robot vehicle 120 may utilize other authenticating methods, which persons skilled in the art will recognize. After verifying the customer 140, the robot vehicle 120 can grant the customer access to the product, and the customer 140 can retrieve the selected product from the compartment 340.

Figure 4:
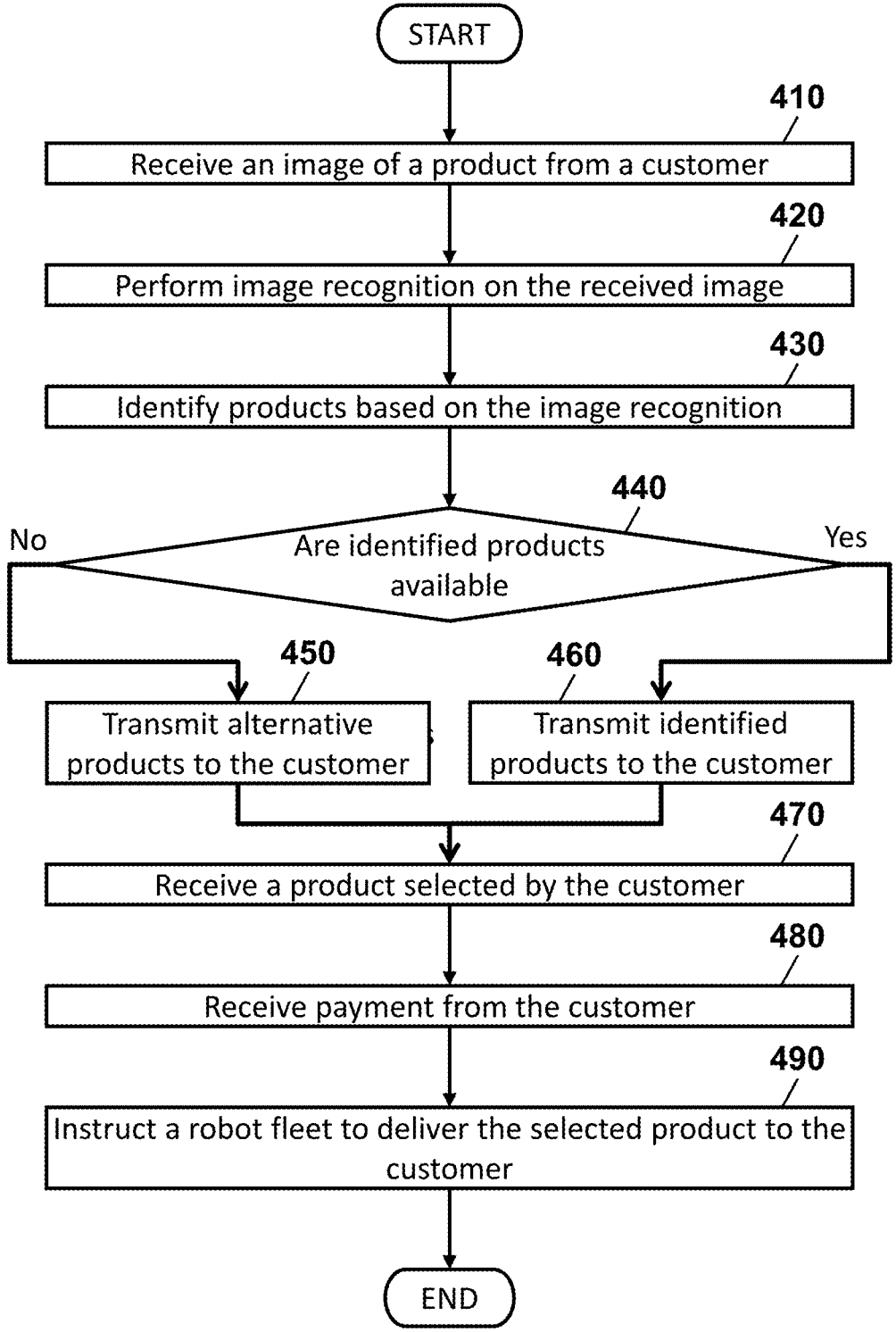
FIG. 4 is a flowchart illustrating an exemplary method for delivering products based on a visual search, in accordance with aspects of the present disclosure.

FIG. 4 shows a method 400 for autonomously delivering a product based on a visual search according to embodiments of the present disclosure. In the illustrated embodiment, the method 400 involves a delivery control system, a customer, a robot fleet, and one or more merchants. The method 400 begins by receiving an image of a product from a smart device of the customer in step 410. The image may be captured from any arbitrary angle and does not need to include a barcode, a product name, or a brand name. When the customer finds a product he wants to purchase, the customer may capture or access an image thereof, such as taking a picture of the product receive an image from a friend, or accessing the image from a webpage.

In step 420, the delivery control system may perform image recognition algorithms to identify which product is shown in the image. In an aspect, the image recognition algorithms may be trained by machine learning or run by artificial intelligence technology. In another aspect, the delivery control system includes a database, which stores various images of products captured in various angles. The delivery control system may be trained with these images to increase probability or credibility of search results by the image recognition algorithms. Further, the machine learning or the artificial intelligence technology may train the image recognition algorithms to account for lighting or shading to more accurately identify the product captured in the image.

In step 430, the image recognition algorithms may result in identifying one or more products based on the image. Then, the delivery control system determines in step 440 whether or not the identified products are available, such as whether the identified products are in stock in one or more robot vehicles or at one or more merchants.

In a case when it is determined that the identified products are not available in step 440, the delivery control system may find and suggest to the customer products, which have lower scores from the image recognition algorithms than those of the identified products. By providing alternate products, the customer experiences better service and is exposed to a variety of options provided by the merchants.

In another case when it is determined that the identified products are available in step 440, the delivery control system transmits the identified products to the customer device in step 460.

Upon reception of the identified products or the alternate products, the customer selects a product therefrom and transmits the selected product to the delivery control system.

In some embodiments, a list of merchants who provide or handle the identified products or the alternate products may be transmitted to the customer in steps 450 and 460. Thus, the customer receives an opportunity to further select his/her preferred merchant.

In step 470, the delivery control system receives the selected product and in step 480, the delivery control system receives a payment for the selected product from the customer.

In step 490, the delivery control system instructs a vehicle of the robot fleet to deliver the selected product to the location of the customer. In particular, the delivery control system may search for a robot vehicle in the robot fleet is carrying the selected product and is optimally located to travel to the location of the customer.

In some embodiments, when the selected product is not available in the robot fleet, the delivery control system may instruct a robot vehicle to travel to a merchant which has the selected product in stock. The selected vehicle is restocked by the merchant and delivers the selected product to the customer in step 490.

After arrival of the robot vehicle to the customer location, robot vehicle can authenticate and verify the recipient before permitting the recipient to access the selected product. Various authentication and verification mechanisms can be used, including the various mechanism described above herein.

In some embodiments, if the delivered product is not what the customer wants or is defective, the customer may return it by using the same robot vehicle at the arrival. In various embodiments, the customer may return it later by summoning another robot vehicle.

Figure 5:
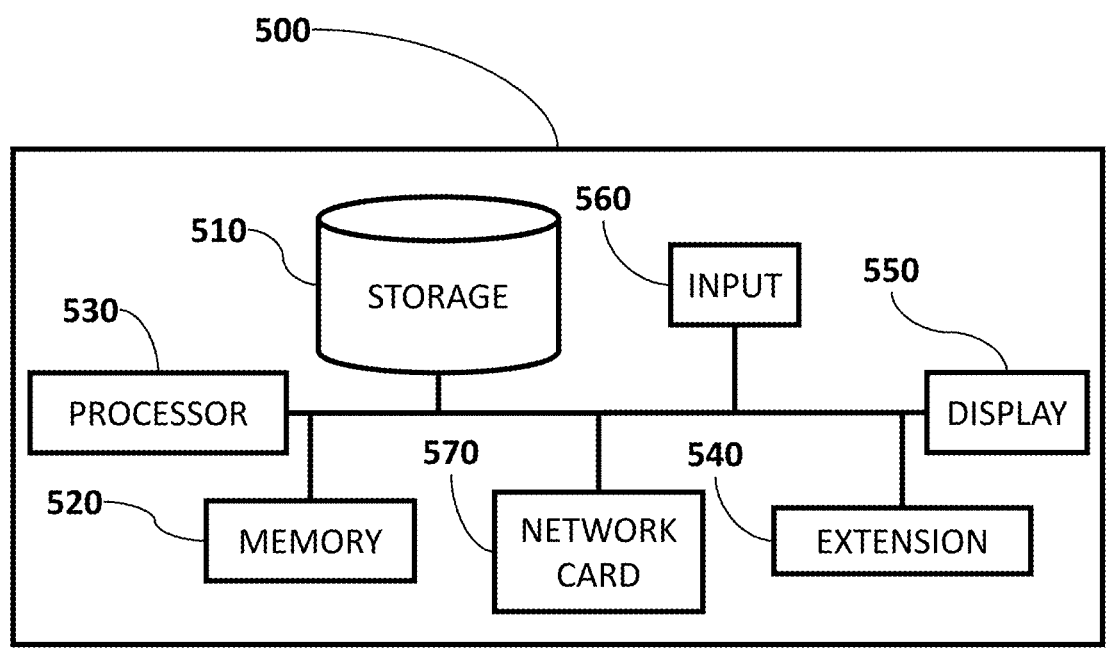
FIG. 5 is a functional block diagram of an exemplary delivery system or smart device, in accordance with aspects of the present disclosure.

FIG. 5 is a block diagram for an exemplary computing system or device 500 representative of the delivery control system or controller of the robot fleet of FIG. 1, the smart device of FIG. 2, or a controller of the robot vehicle of FIG. 3, in accordance with embodiments of the present disclosure. The computing system or device 500 may include a storage 510, memory 520, processor 530, extension 540, display device 550, input device 560, and network card 570. The storage 510 stores data to be accessed for reading and editing programs to be executed. The memory 520 may include a random-access memory (RAM) and a read-only memory (ROM). The ROM generally stores booting programs that run when the computing device is turned on and the RAM is used for fast performance, i.e., loading a program and/or calculating data.

In various embodiments, the processor 530 executes instructions which implement tasks or functions of programs. When a user executes a program, the processor 530 reads the program stored in the storage 510, loads the program on the RAM, and executes instructions prescribed by the program. In various embodiments, the processor 530 can be or can include a programmable logic circuit, such as a field programmable gate array (FPGA), among others. In various embodiments, the processor 530 can be or can include be a microcontroller, a central processing unit (CPU), a graphics processing unit (GPU), or a digital signal processor (DSP), among other types of processors.

A user may input and/or modify data via the input device 560 that may include a keyboard, a mouse, or any other device with which the use may input data. The display device 550 displays data on a screen of the display device 550. The display device 550 may be a touch screen so that the display device 550 can be used as an input device.

The extension 540 may include several ports, such as one or more universal serial buses (USBs), IEEE 1394 ports, parallel ports, and/or expansion slots such as peripheral component interconnect (PCI) and PCI express (PCIe). The extension 540 is not limited to the list but may include other slots or ports that can be used for appropriate purposes. The extension 540 may be used to install hardware or add additional functionalities to a computer that may facilitate the purposes of the computer. For example, a USB port can be used for adding a storage to the computer and/or an IEEE 1394 may be used for receiving moving/still image data.

The network card 570 is used to communicate with the robot vehicles or mobile devices, either wirelessly or via a wired connection. Through the network card 570, the robot vehicles or mobile devices may receive, modify, and/or update from and to the managing server.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A delivery control system comprising:
   a communication device configured to:
      obtain, from a plurality of merchants, a plurality of images of a plurality of products, wherein the plurality of images captures each of the plurality of products in a plurality of lightings;
      obtain a first image of a first product from a computing device of a customer; and
      obtain an indication of one or more customer-preferred merchants from the computing device of the customer;
   at least one processor; and
   a memory storing instructions which, when executed by the at least one processor, cause the delivery control system to:
      train an image recognition process based on the plurality of images using machine learning;
      perform the image recognition process on the first image to identify at least one alternate product when the first product is not available based on at least one score of the at least one alternate product assigned by the image recognition process, wherein the image recognition process is constrained by the one or more customer-preferred merchants;
      provide an indication of the at least one alternate product to the computing device of the customer via the communication device;
      obtain, from the computing device of the customer, an indication of a product selected by the customer from among the at least one alternate product; and
      instruct a robot vehicle to deliver, to the customer, the product selected by the customer.

2. The delivery control system according to claim 1, wherein the instructions, when executed by the at least one processor, further cause the delivery control system to:
   transmit an indication of the plurality of merchants to the computing device of the customer,
   wherein the communication device is configured to obtain the indication of the one or more customer-preferred merchants in response to transmitting the indication of the plurality of merchants to the computing device of the customer.

3. The delivery control system according to claim 1, wherein the at least one alternate product is handled by at least one merchant of the one or more customer-preferred merchants.

4. The delivery control system according to claim 3, wherein the instructions, when executed by the at least one processor, further cause the delivery control system to:
   transmit an indication of the at least one merchant to the computing device of the customer via the communication device.

5. The delivery control system according to claim 4, wherein the communication device is further configured to:

obtain, from the computing device of the customer, an indication of a merchant selected from the at least one merchant.

6. The delivery control system of claim 1, wherein the plurality of images captures each of the plurality of products in a plurality of views.

7. The delivery control system of claim 1, wherein the plurality of images captures each of the plurality of products in a plurality of surroundings.

8. The delivery control system according to claim 1, wherein the instructions cause the delivery control system to:
train the image recognition process based on the plurality of lightings using machine learning.

9. A computing device for ordering a product, the computing device comprising:
a communication device;
a display screen;
at least one processor; and
a memory storing instructions which, when executed by the at least one processor, cause the computing device to:
provide, via the communication device, a first image of a first product and an indication of one or more customer-preferred merchants to a delivery control system configured to obtain, from a plurality of merchants, a plurality of images of a plurality of products and train an image recognition process based on the plurality of images using machine learning, wherein the plurality of images captures each of the plurality of products in a plurality of lightings;
obtain an indication of at least one alternate product identified based on at least one score of the at least one alternate product assigned by the image recognition process when the first product is not available, wherein the image recognition process is constrained by the one or more customer-preferred merchants;
display the at least one alternate product on the display screen;
obtain a user selection from among the at least one alternate product, the user selection indicating a selected product; and
provide, via the communication device, an order for the selected product to the delivery control system.

10. The computing device according to claim 9, wherein the at least one alternate product is handled by at least one merchant of the one or more customer-preferred merchants.

11. The computing device according to claim 10, wherein the instructions, when executed by the at least one processor, further cause the computing device to:
obtain an indication of the plurality of merchants from the delivery control system.

12. The computing device according to claim 11, wherein the communication device is further configured to:
provide an indication of a merchant selected by a user from the plurality of merchants.

13. The computing device according to claim 12, wherein the selected product is handled by the merchant selected by the user.

14. The computing device according to claim 9, wherein the delivery control system is configured to train the image recognition process based on the plurality of lightings using machine learning.

15. One or more non-transitory computer readable storage media including instructions which, when executed by a computer, cause the computer to perform a method comprising:
obtaining, from a plurality of merchants, a plurality of images of a plurality of products, wherein the plurality of images captures each of the plurality of products in a plurality of lightings;
obtaining a first image of a first product from a computing device of a customer;
obtaining an indication of one or more customer-preferred merchants from the computing device of the customer;
training an image recognition process based on the plurality of images using machine learning;
performing the image recognition process on the first image to identify at least one alternate product when the first product is not available based on at least one score of the at least one alternate product assigned by the image recognition process, wherein the image recognition process is constrained by the one or more customer-preferred merchants;
providing an indication of the at least one alternate product to the computing device of the customer;
obtaining, from the computing device of the customer, an indication of a product selected by the customer from among the at least one alternate product; and
instructing a robot vehicle to deliver, to the customer, the product selected by the customer.

16. The one or more non-transitory computer readable storage media of claim 15, wherein the method further comprises:
transmitting an indication of the plurality of merchants to the computing device of the customer,
wherein obtaining the indication of the one or more customer-preferred merchants includes obtaining the indication of the one or more customer-preferred merchants in response to transmitting the indication of the plurality of merchants to the computing device of the customer.

17. The one or more non-transitory computer readable storage media of claim 15, wherein the at least one alternate product is handled by at least one merchant of the one or more customer-preferred merchants.

18. The one or more non-transitory computer readable storage media of claim 17, wherein the method further comprises:
transmitting an indication of the at least one merchant to the computing device of the customer.

19. The one or more non-transitory computer readable storage media of claim 18, wherein the method further comprises:
obtaining, from the computing device of the customer, an indication of a merchant selected from the at least one merchant.

20. The one or more non-transitory computer readable storage media of claim 15, wherein the plurality of images includes images of each of the plurality of products in a plurality of views.

* * * * *